US006475320B1

(12) United States Patent
Masugi

(10) Patent No.: US 6,475,320 B1
(45) Date of Patent: Nov. 5, 2002

(54) METHOD OF FABRICATING COMPOSITE MATERIAL WING

(75) Inventor: Kyoichi Masugi, Tokyo-To (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 16 days.

(21) Appl. No.: 09/624,873

(22) Filed: Jul. 21, 2000

(30) Foreign Application Priority Data

Aug. 6, 1999 (JP) .............................. 11-224473

(51) Int. Cl.[7] .............................. B65H 81/00; B64C 3/24
(52) U.S. Cl. ...................... 156/189; 156/242; 156/245; 264/645; 264/257; 264/328.2; 244/119; 244/123
(58) Field of Search ................ 156/184, 189, 156/190, 191, 195, 242, 245, 305, 381; 264/645, 136, 137, 257, 258, 263, 297.2, 325, 328.1, 328.2, 512–513, 515, 171.26, 241, 246–247, 250–251, 259–261; 244/119–120, 123–126

(56) References Cited

U.S. PATENT DOCUMENTS 4,717,330 A * 1/1988 Sarh ........................ 249/146
5,152,949 A * 10/1992 Leoni et al. ................ 264/257
5,403,537 A * 4/1995 Seal et al. .................. 156/245
5,911,932 A * 6/1999 Dyksterhouse .............. 264/136
6,217,000 B1 * 4/2001 Younie et al. .............. 244/123

* cited by examiner

Primary Examiner—Michael W. Ball
Assistant Examiner—Jessica Rossi
(74) Attorney, Agent, or Firm—Martin A. Farber

(57) ABSTRACT

Reinforcing textile sheets (10, 11, 12, 16, 17) are superposed on mandrels (9, 14 and 15). The reinforcing textile sheets superposed on the mandrels are placed in a closed jig (2, 3). A thermosetting resin is introduced into the closed jig to impregnate the superposed reinforcing textile sheets. The thermosetting resin impregnated into the superposed reinforcing textile sheets is made to half-set in the closed jig to form a half-set composite material wing component member including a rear spar, ribs, an upper skin and a lower skin. The half-set composite material wing component member is taken out of the jig and the mandrel is removed from the half-set composite material wing component member. The half-set composite material wing component member and a half-set front spar are bonded together with an adhesive to form a half-set wing structure. The half-set wing structure is subjected to a high-temperature setting process to set the wing structure and the adhesive simultaneously.

2 Claims, 5 Drawing Sheets

METHOD OF FABRICATING COMPOSITE MATERIAL WING

BACKGROUND OF THE INVENTION

1. Field of the Invention

The present invention relates to a method of fabricating a composite material wing, such as a fiber-reinforced plastic, and, more specifically, to a method of fabricating a composite material wing of a box structure having closed spaces by a single high-temperature heat-setting process to shorten a molding process and to reduce assembling work.

2. Description of the Related Art

Most conventional aircraft main wings are of built-up construction. Further lightweight aircraft main wings of a composite material having a high specific strength have been developed. A composite material aircraft main wing of a box structure is assembled by joining together parts including spars, skins and ribs individually formed by a resin transfer method (RTM) or a hand lay-up method with an adhesive or fasteners in a box structure. Since a part of a fiber-reinforced plastic, i.e., composite material, is soft before being set, the part of the fiber-reinforced plastic must be kept in a desired shape by using a mandrel and the mandrel must be removed after setting the part of the fiber-reinforced plastic. Therefore, the conventional wing of a box structure can not be formed in an integral structure by molding; the wing must be provided with an opening through which a mandrel can be removed, and an individually formed member for closing the opening must be joined to the wing with fasteners or an adhesive.

Forming jigs are used in forming the parts for the aircraft main wing of a box structure including spars, skins and ribs. The forming jigs must be made of a heat-resistant material because the parts are formed at high temperatures by a heat-setting process.

When assembling a composite material aircraft main wing by an assembling method using an adhesive, the parts need to be subjected to high-temperature heat setting twice when forming the parts and when adhesively assembling the same. When assembling the aircraft main wing of a composite material by an assembling method using fasteners, the parts need to be subjected to heat setting only once. However, this method of assembling the main wing that joins together the parts with the fasteners needs assembling jigs and takes much time.

SUMMARY OF THE INVENTION

Accordingly, it is an object of the present invention to provide a method of fabricating an aircraft main wing of a composite material in a box structure having closed spaces capable of forming the main wing by a low-temperature half-setting process and a heat-setting process, of shortening a molding process and reducing assembling work.

According to a first aspect of the present invention, a method of fabricating a composite material wing includes the steps of: superposing a reinforcing textile sheet on a mandrel; closely enclosing the reinforcing textile sheet superposed on the mandrel in a closed jig; introducing a thermosetting resin into the closed jig to impregnate the reinforcing textile sheet with the thermosetting resin; making the thermosetting resin impregnated into the superposed reinforcing textile sheet half-set to form a half-set composite material wing component member; taking the half-set composite material wing component member and the mandrel out of the jig; removing the mandrel from the half-set composite material wing component member; bonding the half-set composite material wing component member and an other wing component member with an adhesive to form an assembly; and heat-setting the assembly to complete a composite material wing.

Preferably, the other wing component member is a composite material wing component member formed by impregnating a reinforcing textile sheet with a thermosetting resin. Preferably, the composite material wing is a box structure having a closed space. Preferably, each of the wing component members includes at least one of a front spar, a rear spar, a plurality of ribs extended between the front spar and the rear spar, an upper skin overlying the ribs, and a lower skin underlying the ribs. Preferably, at least one of the wing component members is an integral member formed by integrally combining at least two of the front spar, the rear spar, the ribs, the upper skin and the lower skin.

According to a second aspect of the present invention, a method of fabricating a composite material wing including a front spar, a rear spar, a plurality of ribs extended between the front and the rear spar, an upper skin overlying the ribs and a lower skin underlying the ribs includes the steps of: superposing a plurality of reinforcing textile sheets for the rear spar, the ribs, the upper skin and the lower skin on a mandrel corresponding to a wing structure; closely enclosing the reinforcing textile sheets superposed on the mandrel in a closed jig; impregnating the reinforcing textile sheets with a thermosetting resin by introducing the thermosetting resin into the closed jig; making the thermosetting resin impregnated into the superposed reinforcing textile sheets half-set to form a half-set composite material wing component member; taking the half-set composite material wing component member and the mandrel out of the closed jig; removing the mandrel from the half-set composite material wing component member integrally including the rear spar, the ribs, the upper skin and the lower skin; bonding the half-set composite material wing component member and a wing component member corresponding to a front spar with an adhesive to form an assembly; and heat-setting the assembly to complete a composite material wing.

Preferably, the wing component member corresponding to the front spar is a half-set composite material member formed by impregnating a reinforcing textile sheet with a thermosetting resin.

The reinforcing textile sheets superposed on the mandrels are sealed in the closed jig, the superposed reinforcing textile sheets are impregnated with the thermosetting resin, the thermosetting resin impregnated into the superposed reinforcing textile sheets is half-set to form the half-set component members or the composite component member, the mandrels are removed from the half-set component members or the composite component member, the half-set component members are assembled and adhesively bonded together with the adhesive to form a composite structure and the composite structure is subjected to the high-temperature setting process to set the thermosetting resin. Thus, the thermosetting resin and the adhesive can be simultaneously heated and hence only a single high-temperature setting process is necessary for forming the composite material wing of a box structure having closed spaces.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
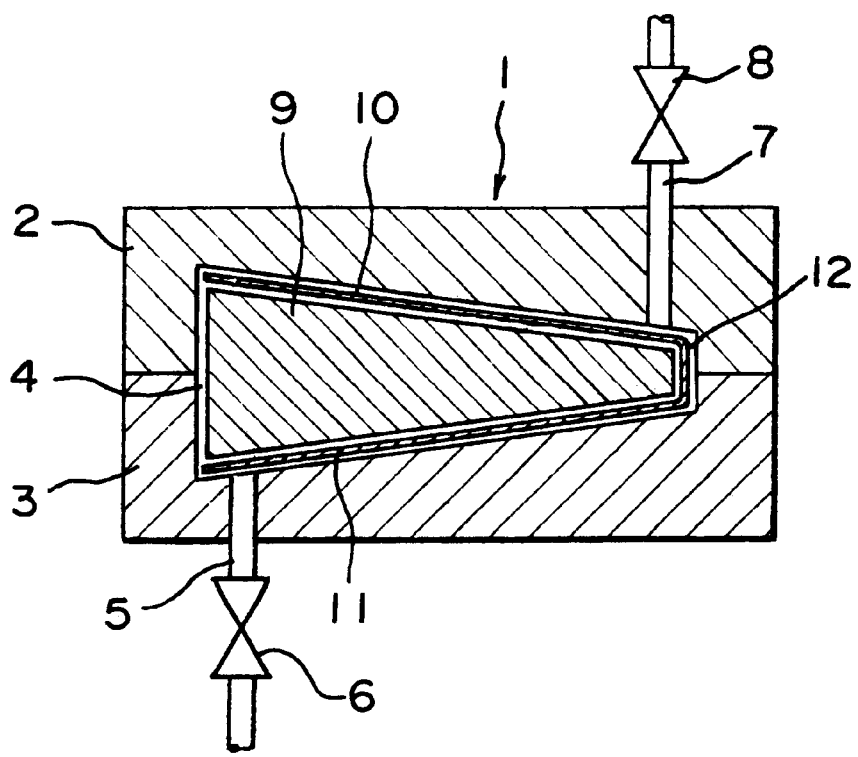
FIG. 1 is a sectional view of a closed jig employed in a method of fabricating a composite material wing according to the present invention.
Figure 2:
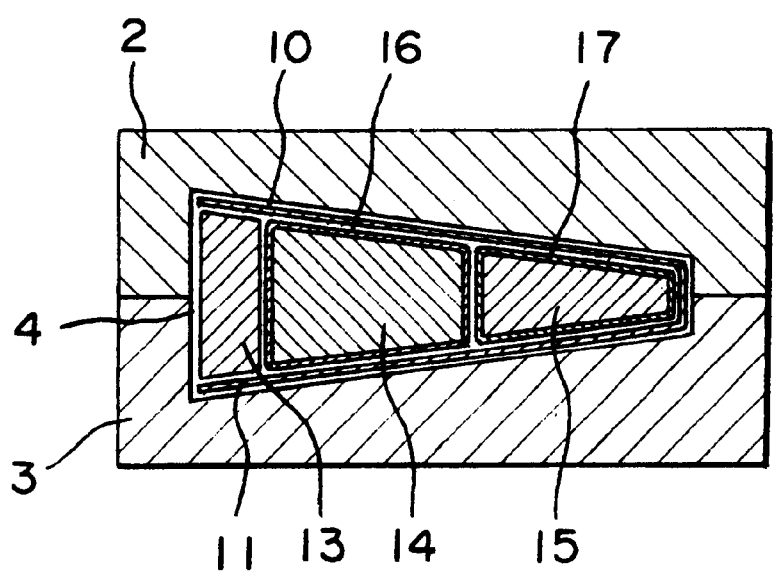
FIG. 2 is a sectional view of a portion of the closed jig shown in FIG. 1 different from that shown in FIG. 1.

Referring to FIGS. 1 and 2, a closed jig 1 employed in a method of fabricating composite material wing in a preferred embodiment according to the present invention is used for forming a half-set wing component member having parts corresponding to a rear spar, ribs, an upper skin and a lower skin by impregnating reinforcing textile sheets with a thermosetting resin and half-setting the reinforcing textile sheets impregnated with the thermosetting resin by an RTM. FIG. 1 shows a cross section of a portion of the closed jig 1 corresponding to a portion of the half-set wing component not provided with the rib and FIG. 2 shows a cross section of a portion of the closed jig 1 corresponding to a portion of the half-set wing component provided with the rib (see FIG. 6). The term "half-set" signifies a state of a thermosetting resin in which the thermosetting resin is solidified and not completely set, i.e., molecules of the thermosetting resin have not yet been completely crosslinked, but the thermosetting resin will not be liquefied (gelated) at temperatures below about 180° C. Gelation does not mean glass transition. A half-set state corresponds to a state of a two-part thermosetting resin prepared by mixing, for example, Epicoat 6003® (resin) available from Yuka Shell Epoxy and Epicure 150D® (accelerator) available from Yuka Shell Epoxy in a predetermined mixing ratio, and kept at 60° C. for about 12 h.

The closed jig 1 has an upper half jig 2 and a lower half jig 3. The upper half jig 2 and the lower half jig 3 are joined and together are clamped by a clamping device, not shown, to define a closed space 4. A pipe 5 provided with a valve 6 is connected to a port of the lower half jig 3 so as to communicate with the closed space 4. A pipe 7 provided with a valve 8 is connected to a port of the upper half jig 2 so as to communicate with the closed space 4.

Figure 6:
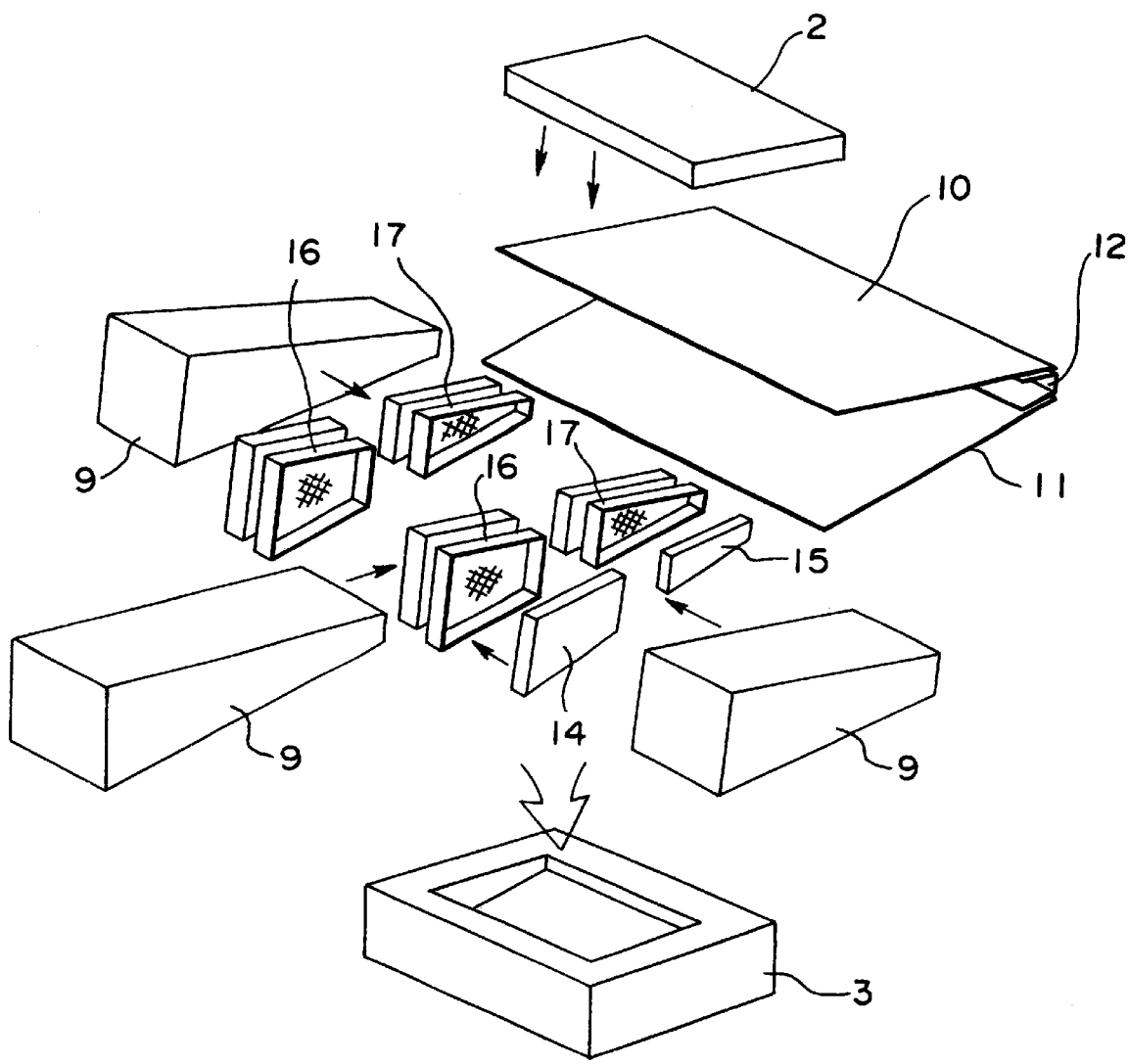
FIG. 6 is a perspective view of reinforcing textile sheets for forming upper and lower skins, a rear spar and ribs, mandrels, and jigs in a first step of a method of fabricating a composite material wing according to the present invention.

Skin forming mandrels 9 (see FIG. 6) for forming a skin are disposed in a portion of the closed space 4 shown in FIG. 1. An upper skin reinforcing textile sheet 10, a lower skin reinforcing textile sheet 11, and a rear spar reinforcing textile sheet 12 are superposed on the skin forming mandrel 9. The upper skin reinforcing textile sheet 10, the lower skin reinforcing textile sheet 11, and the rear spar reinforcing textile sheet 12 may be either integrated reinforcing textile sheets as shown in FIG. 6 or separate reinforcing textile sheets.

Rib forming mandrels 13, 14 and 15 for forming ribs are disposed in a portion of the closed space 4 of the jig 1 shown in FIG. 2. Rib reinforcing textile sheets 16 are superposed on the rib forming mandrels 14 and rib reinforcing textile sheets 17 are superposed on the rib forming mandrels 15.

Figure 3:
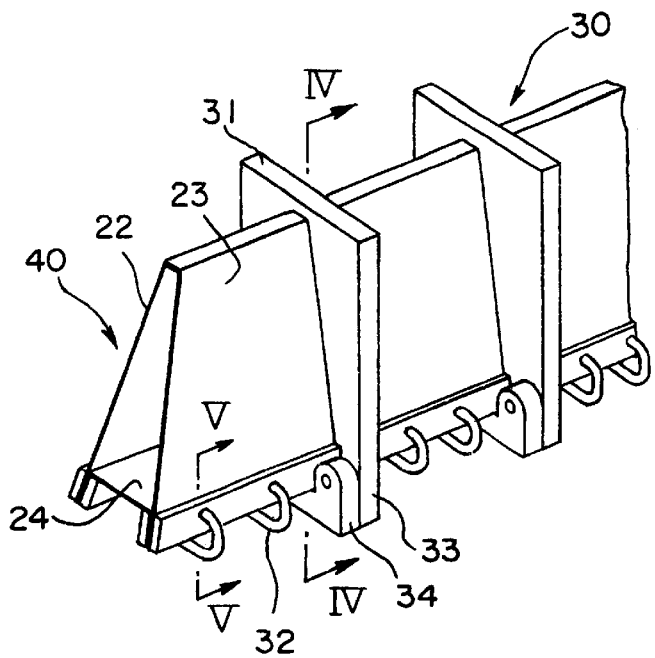
FIG. 3 is a perspective view of a forming jig to be used for bonding together a half-set integral wing component member and a front spar.
Figure 4:
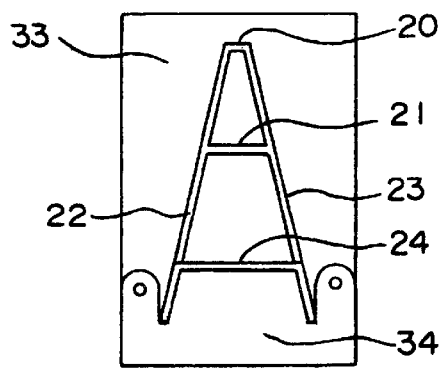
FIG. 4 is a sectional view taken on line IV—IV in FIG. 3.
Figure 5:
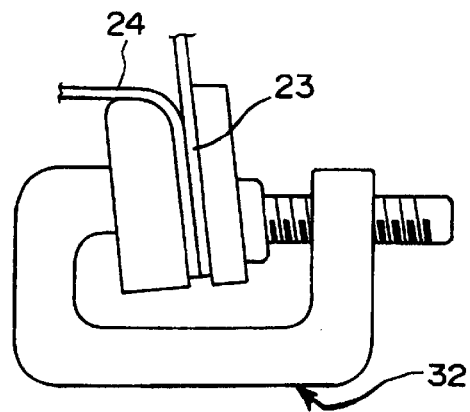
FIG. 5 is a sectional view taken on line V—V in FIG. 3.

FIGS. 3 and 4 show a forming jig 30 for forming a wing component member by bonding together half-set fiber-reinforced thermosetting resin parts, namely, a rear spar 20, a rib 21, an upper skin 22, a lower skin 23 and a front spar 24, with an adhesive in a half-set fiber-reinforced thermosetting resin assembly, and setting the half-set thermosetting resin assembly. The forming jig 30 has skin jigs 31 for holding the half-set skins 22 and 23 and the rear spar 20 in a predetermined shape, and front spar clamps 32 for holding together the half-set front spar 24 and the half-set skins 22 and 23. As shown in FIGS. 3 and 4, each skin jig 31 has two members 33 and 34 capable of being detachably joined together. The half-set wing component members, i.e., the rear spar 20, the ribs 21 and the skins 22 and 23, are held in a predetermined positional relation by the skin jigs 31. As shown in FIG. 5, the front spar clamps 32 clamp together joining portions coated with an adhesive of the half-set front spar 24 and the half-set skins 22 and 23 (only the joint of the front spar 24 and the skin 23 is shown in FIG. 5).

Figure 7:
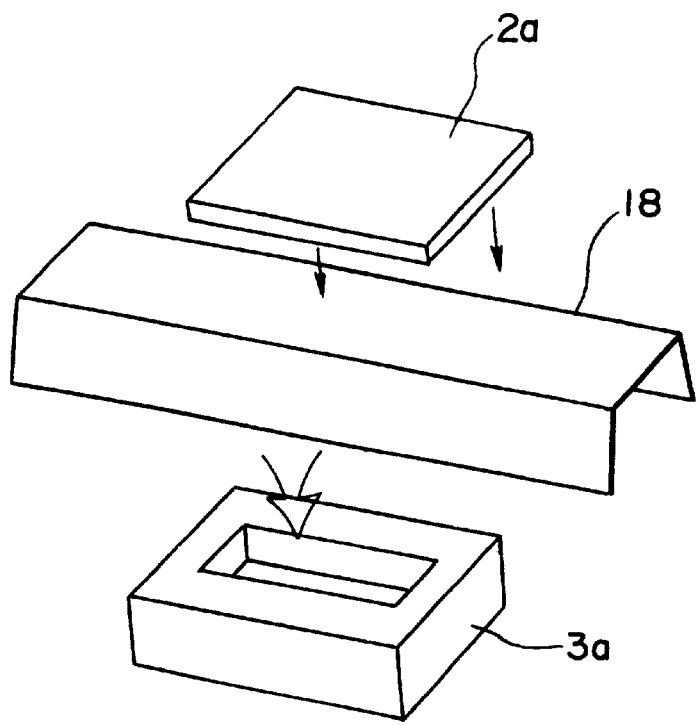
FIG. 7 is a perspective view of a reinforcing textile sheet for forming a front spar, and jigs in a first step of the method of fabricating a wing of a composite material according to the present invention.

A method of fabricating a composite material wing in a preferred embodiment according to the present invention will be described with reference to FIGS. 6 to 10. An upper skin reinforcing textile sheet 10, a lower skin reinforcing textile sheet 11, a rear spar reinforcing textile sheet 12, rib reinforcing textile sheets 16 and 17, and a front spar reinforcing textile sheet 18 as shown in FIGS. 6 and 7 are prepared by cutting a three-dimensional or two-dimensional fabric of reinforcing fibers in dimensions corresponding to those of the upper skin, the lower skin, the rear spar, the ribs and the front spar of a composite material wing. As shown in FIG. 6, the rib reinforcing textile sheets 16 and 17 are superposed on rib forming mandrels 14 and 15, respectively, and the upper skin reinforcing textile sheet 10, the lower skin reinforcing textile sheet 11 and the rear spar reinforcing textile sheet 12 are superposed on skin forming mandrels 9. As shown in FIG. 7, the front spar reinforcing textile sheet 18 is superposed on a front spar forming mandrel, not shown. Thus, the reinforcing textile sheets are formed in a predetermined shape.

The rib reinforcing textile sheets 16 and 17, the skin reinforcing textile sheets 10 and 11 and the rear spar reinforcing textile sheet 12 are assembled in a predetermined structure of the composite material wing to be formed. The structure constructed of the reinforcing textile sheets 10, 11, 12, 16 and 17 is sealed in the closed space 4 defined by the upper half jig 2 and the lower half jig 3.

The closed space 4 defined by the upper half jig 2 and the lower half jig 3 is evacuated through the pipe 7 connected to the upper half jig 2, and a two-part thermosetting resin that sets at a relatively low temperature is injected into the closed space 4 through the pipe 5 connected to the lower half jig 3. The closed space 4 is evacuated through the pipe 7 connected to the upper half jig 2 until the thermosetting resin injected into the closed space 4 through the pipe 5 connected to the lower half jig 3 flows out of the closed space 4 through the pipe 7 connected to the upper half jig 2. As the thermosetting resin, the above-mentioned two-part thermosetting resin prepared by mixing Epicoat 6003® (resin) and Epicure 1500® (accelerator) in a predetermined mixing rate can be employed.

The reinforcing textile sheets 10, 11, 12, 16 and 17 are impregnated with the thermosetting resin injected into the closed space 4. After the confirmation of impregnation of the reinforcing textile sheets 10, 11, 12, 16 and 17 with the thermosetting resin, the thermosetting resin is heated at 60° C. for about 12 h under the control of a controller, not shown, to obtain a half-set fiber-reinforced thermosetting resin structure. Meanwhile, the front spar reinforcing textile sheet 18 is superposed on a front spar forming mandrel, not shown, as shown in FIG. 7, the superposed front spar reinforcing textile sheet 18 is placed in a closed space defined by an upper half jig 2a and a lower half jig 3a, the closed space is evacuated, the two-part thermosetting resin that sets at a relatively low temperature is injected into the evacuated closed space to impregnate the front spar reinforcing textile sheet 18 with the thermosetting resin. The front spar reinforcing textile sheet 18 impregnated with the thermosetting resin is heated at 60° C. for about 12 h to half-set the thermosetting resin impregnated into the front spar reinforcing textile sheets 18.

Figure 8:
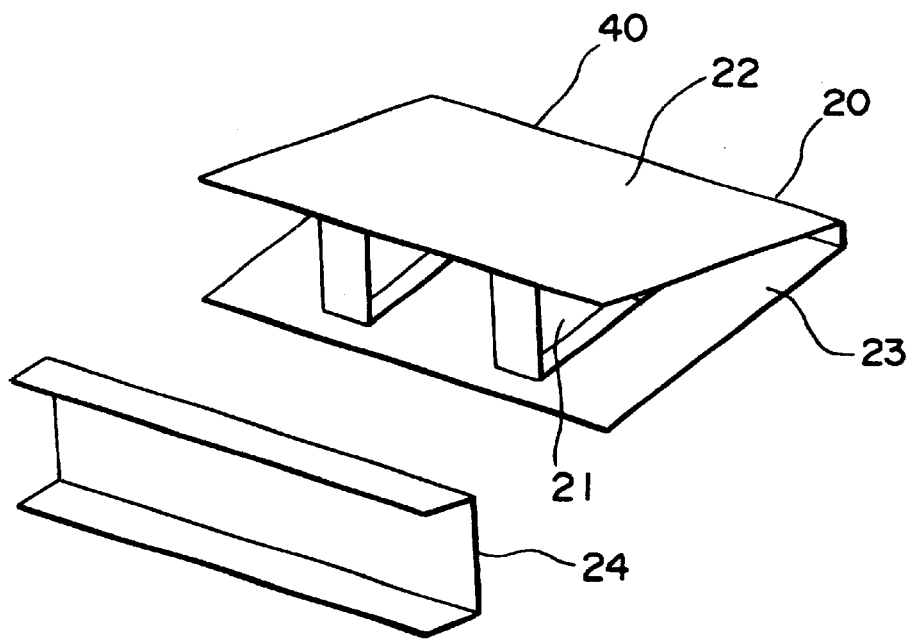
FIG. 8 is a perspective view of half-set component members in a second step of the method of fabricating the wing of a composite material according to the present invention.
Figure 9:
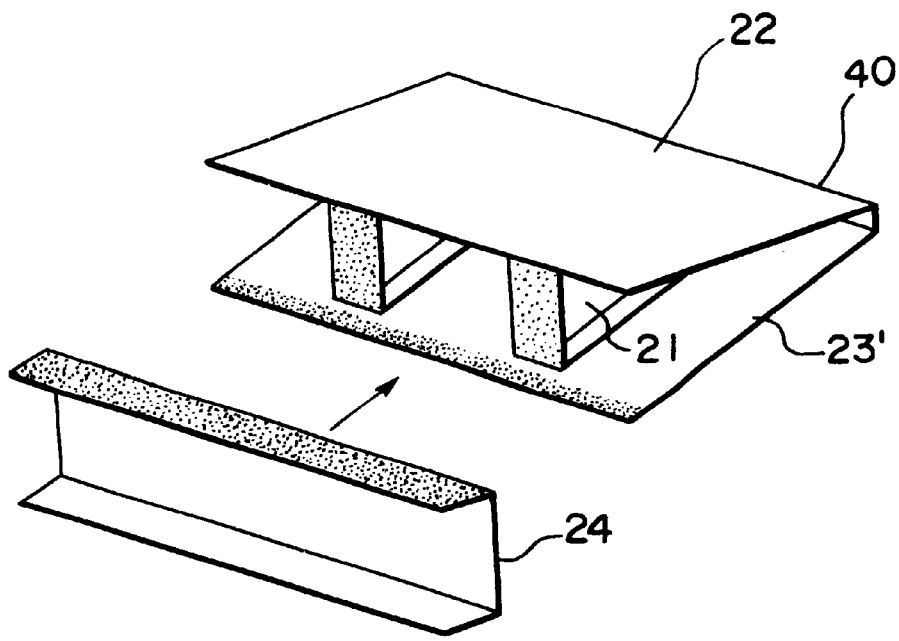
FIG. 9 is a perspective view of component members having joining portions coated with an adhesive in a third step of the method of fabricating the wing of a composite material according to the present invention.
Figure 10:
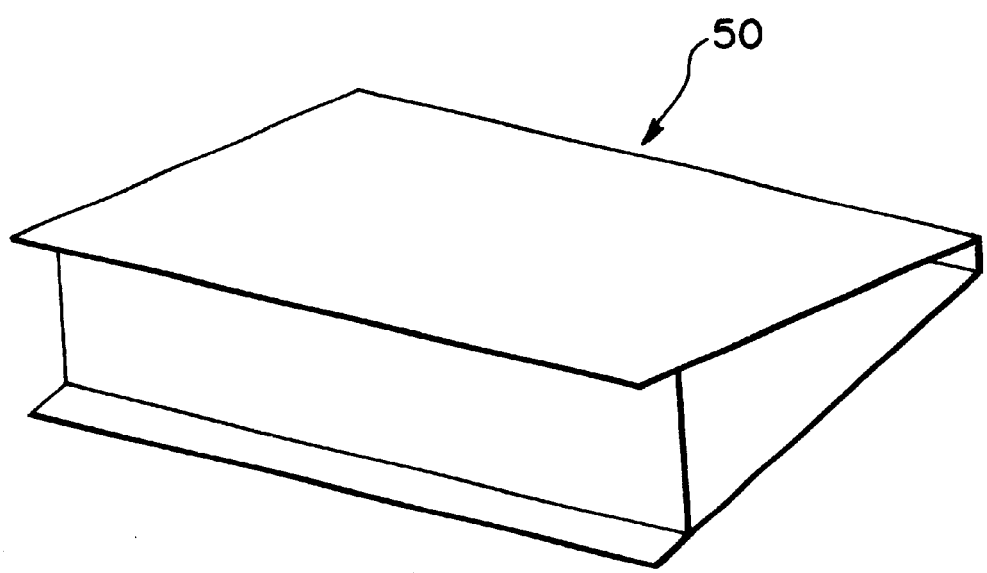
FIG. 10 is a perspective view of a wing of a composite material formed by the method of fabricating the wing of a composite material according to the present invention.

After the confirmation of the half-setting of the thermosetting resin impregnated into the reinforcing textile sheets 10, 11, 12, 16 and 17, the upper half jig 2 and the lower half jig 3 are opened, and the upper half jig 2, the lower half jig 3 and the mandrels 9, 13, 14 and 15 are removed from a half-set rear spar 20, half-set ribs 21, and half-set skins 10 and 11 to obtain a half-set composite structure 40 as shown in FIG. 8. The half-set front spar 24 is disposed opposite to an open side of the half-set composite structure 40. Joining portions of the half-set composite structure 40 and the half-set front spar 24, i.e., shaded portions of the ribs 21, the skins 22 and 23 and the front spar 24 in FIG. 9, are coated with an adhesive and are bonded together to combine the half-set composite structure 40 and the half-set frontspar24. The half-set compositestructure 40 and the half-set front spar 24 thus adhesively bonded together are held in a predetermined shape by the forming jig 30 including the skin jigs 31 for holding the half-set skins 22 and 23 and the half-set rear spar 20, and the front spar clamps 32 for holding together the half-set front spar 24 and the half-set skins 22 and 23. Then, the half-set composite structure 40 and the half-set front spar 24 are heated at 180° C. for about 2 h to set the thermosetting resin and the adhesive simultaneously to complete a composite material wing 50 shown in FIG. 10.

Additional jigs may be employed when subjecting the combination of the half-set composite structure 40 and the half-set front spar 24 to a high-temperature setting process to apply pressure to the entire surface of the combination of the half-set composite structure 40 and the half-set front spar 24.

The method of fabricating a composite material wing in this embodiment assembles the skins, the rear spar and the ribs in the half-set composite structure to impregnate and half-set as many component parts as possible simultaneously to facilitate work and to reduce cost, and bonds the half-set front spar adhesively to the half-set composite structure, and the half-set front spar adhesively to the half-set composite structure thus assembled are subjected to a high-temperature setting process.

The present invention is not limited to the method specifically described above. For example, either of the upper and the lower skin, the front spar, the rear spar and the ribs may be combined, impregnated with the thermosetting resin and formed in a half-set composite structure of a fiber-reinforced plastic. The other skin of the fiber-reinforced plastic may be bonded adhesively to the half-set composite structure, and the other skin and the half-set composite structure thus bonded together may be subjected to a high-temperature setting process. The periphery of the wing is located in the high-temperature setting process to prevent the dislocation of the skins.

The upper and the lower skin, the front and the rear spar and the ribs may be individually formed as component members by superposing reinforcing textile sheets on mandrels respectively for each component member, impregnating the superposed reinforcing textile sheets for each component member with a thermosetting resin in molds respectively, half-setting the thermosetting resin impregnated into the superposed reinforcing textile sheets to form each component member, removing the mandrels from the half-set component members, assembling and adhesively bonding together the half-set component members in a composite structure, and subjecting the composite structure to a high-temperature setting process. The dislocation of the ribs can be prevented to fasten the ribs to the skins with tack bolts, using checking holes provided in spars etc.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A method of fabricating a composite material wing including a front spar, a rear spar, a plurality of ribs extended between the front and the rear spar, an upper skin overlying the ribs and a lower skin underlying the ribs, said method comprising the steps of:

superposing a plurality of reinforcing textile sheets for the rear spar, the ribs, the upper skin and the lower skin on separate mandrels corresponding to a wing structure;

enclosing the reinforcing textile sheets superposed on the separate mandrels in a closed jig;

impregnating the reinforcing textile sheets with a thermosetting resin by introducing the thermosetting resin into the closed jig;

making the thermosetting resin impregnated into the superposed reinforcing textile sheets half-set to form a half-set composite material wing component member;

taking the half-set composite material wing component member and the separate mandrels out of the closed jig;

removing the separate mandrels from the half-set composite material wing component member integrally including the rear spar, the ribs, the upper skin and the lower skin;

bonding the half-set composite material wing component member and a wing component member corresponding to the front spar with an adhesive to form an assembly; and heat-setting the assembly to complete a composite material wing.

2. The method according to claim 1, wherein the wing component member corresponding to the front spar is a half-set composite material member formed by impregnating a reinforcing textile sheet with a thermosetting resin.

* * * * *